(12) United States Patent
Tornatta, Jr. et al.

(10) Patent No.: US 10,714,812 B2
(45) Date of Patent: Jul. 14, 2020

(54) MULTI-RESONANT ANTENNA STRUCTURE

(71) Applicant: CAVENDISH KINETICS, INC., San Jose, CA (US)

(72) Inventors: Paul Anthony Tornatta, Jr., Melbourne, FL (US); Young Joong Lee, Gyeonggi-do (KR); Hak Ryol Kim, Seoul (KR)

(73) Assignee: Cavendish Kinetics, Inc., San Jose, CA (US)

( * ) Notice: Subject to any disclaimer, the term of this patent is extended or adjusted under 35 U.S.C. 154(b) by 0 days.

(21) Appl. No.: 16/342,935

(22) PCT Filed: Oct. 18, 2017

(86) PCT No.: PCT/US2017/057084
§ 371 (c)(1),
(2) Date: Apr. 17, 2019

(87) PCT Pub. No.: WO2018/075578
PCT Pub. Date: Apr. 26, 2018

(65) Prior Publication Data
US 2020/0044309 A1 Feb. 6, 2020

Related U.S. Application Data

(60) Provisional application No. 62/410,933, filed on Oct. 21, 2016.

(51) Int. Cl.
*H04B 1/40* (2015.01)
*H04M 1/02* (2006.01)
(Continued)

(52) U.S. Cl.
CPC ............. *H01Q 1/243* (2013.01); *H01Q 5/30* (2015.01)

(58) Field of Classification Search
CPC . H04B 1/03; H04B 1/08; H04B 1/163; H04B 1/1638; H04B 1/04; H04B 1/16;
(Continued)

(56) References Cited

U.S. PATENT DOCUMENTS 8,497,806 B2 * 7/2013 Lai ..................... H01Q 1/243
343/700 MS
2007/0229376 A1 10/2007 Desclos et al.
(Continued)

FOREIGN PATENT DOCUMENTS

GB 2516304 A 1/2015
WO 2014190306 A1 11/2014
WO 2015125383 A1 8/2015

OTHER PUBLICATIONS

International Preliminary Report on Patentability issued in corresponding International Patent Application No. PCT/US2017/057084, dated Apr. 23, 2019 (8 pages).
(Continued)

*Primary Examiner* — Andrew Wendell
(74) *Attorney, Agent, or Firm* — Withrow & Terranova, P.L.L.C.

(57) ABSTRACT

The present disclosure generally relates to any device capable of wireless communication, such as a mobile telephone or wearable device, having one or more antennas. The antenna has a structure with multiple resonances to cover all commercial wireless communications bands from a single antenna with one feed connection to the main radio system. The antenna is usable where there are two highly efficient, closely spaced resonances in the lower part of the frequency band. One of those resonances can be adjusted in real time by using a variable reactance attached to the radiator while the other resonance is fixed.

15 Claims, 8 Drawing Sheets

(51) Int. Cl.
*H01Q 1/24* (2006.01)
*H01Q 5/30* (2015.01)

(58) Field of Classification Search
CPC . H04B 1/40; H04M 1/02; H04M 1/03; H01Q 1/243; H01Q 5/30
See application file for complete search history.

(56) References Cited

U.S. PATENT DOCUMENTS

| | | | |
|---|---|---|---|
| 2008/0231294 A1* | 9/2008 | You | G01N 27/02 324/725 |
| 2009/0188324 A1* | 7/2009 | Gregory | G01B 7/16 73/773 |
| 2014/0111684 A1 | 4/2014 | Corbin et al. | |
| 2014/0203981 A1* | 7/2014 | Nakano | H01Q 1/521 343/749 |
| 2015/0009086 A1* | 1/2015 | Yeh | H01Q 1/243 343/858 |
| 2015/0091766 A1* | 4/2015 | Ali | H01Q 1/243 343/750 |
| 2016/0049719 A1* | 2/2016 | Tseng | H01Q 1/243 343/702 |
| 2016/0190690 A1* | 6/2016 | Badran | H01Q 1/243 343/750 |
| 2016/0204520 A1* | 7/2016 | Dong | H01Q 21/30 343/745 |
| 2016/0218431 A1 | 7/2016 | Gaddi et al. | |
| 2017/0338546 A1* | 11/2017 | Wong | H01Q 1/243 |
| 2018/0026351 A1* | 1/2018 | Tsai | H01Q 9/0421 455/575.7 |
| 2018/0090817 A1* | 3/2018 | Rajagopalan | H01Q 5/385 |

OTHER PUBLICATIONS

International Search Report and Written Opinion for PCT/US2017/057084, dated Feb. 13, 2018.

* cited by examiner

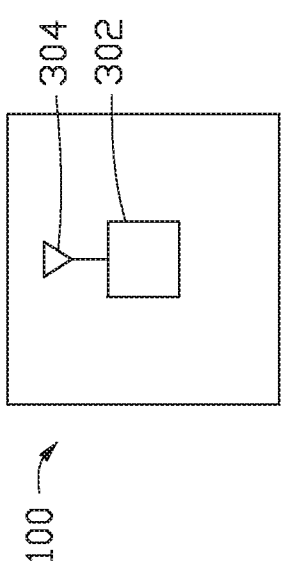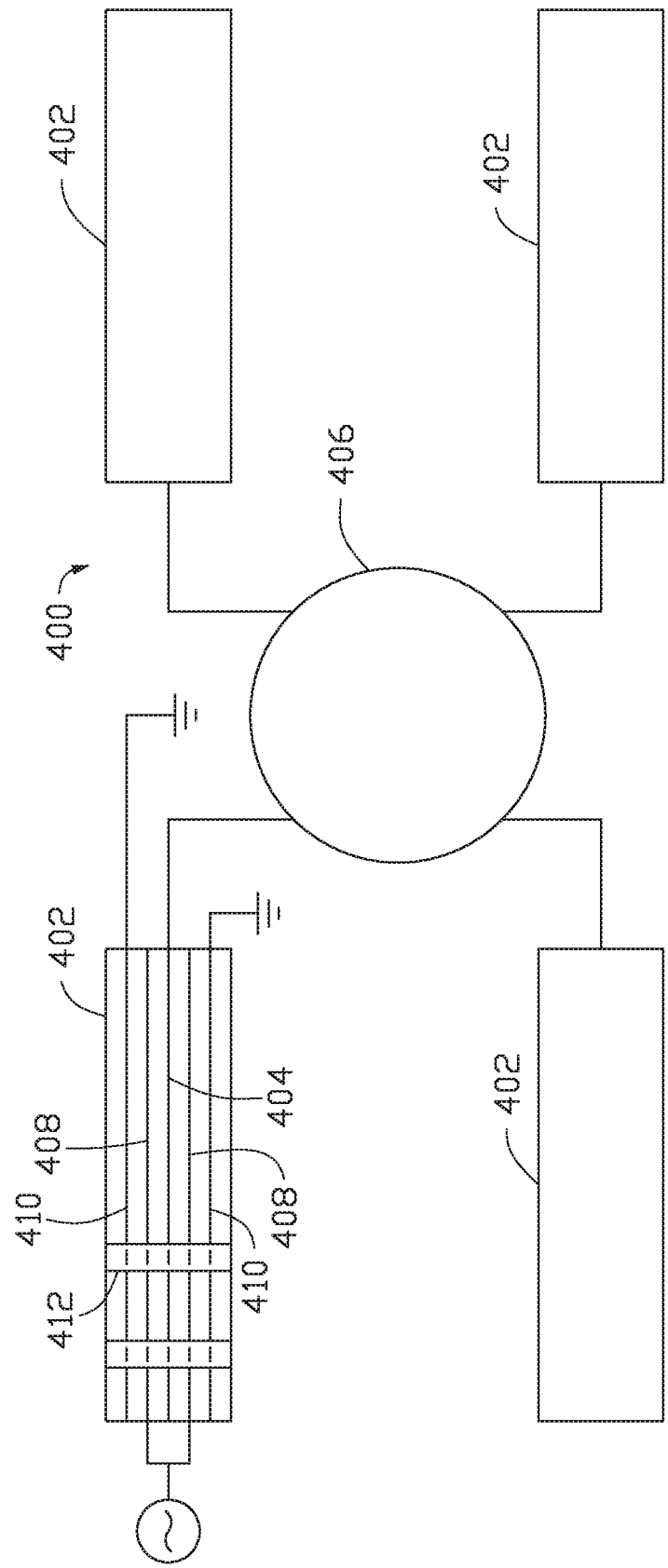

MULTI-RESONANT ANTENNA STRUCTURE

CROSS-REFERENCE TO RELATED APPLICATION

This application claims priority to U.S. Provisional Patent Application No. 62/410,933, filed Oct. 21, 2016, which is expressly incorporated herein by reference in its entirety.

BACKGROUND

Field

Embodiments of the present disclosure generally relate to any device with a wireless modem, such as a mobile telephone or a wearable device, having one or more antennas to support the wireless communication of the device with the corresponding wireless network, further referred to simply as a device.

Description of the Related Art

The antennas used in mobile data devices must cover a wide range of frequencies. Antenna efficiency is a function of antenna size and instantaneous operational bandwidth. Antenna efficiency decreases as the operational bandwidth increases. Antenna efficiency decreases as the antenna size decreases. The typical operational frequencies in modern mobile communication systems are broken in to three frequency ranges. These frequency ranges are determined by local authorities, like the FCC in the US and by local network service providers: low band—698 MHz to 960 MHz; mid band—1710 MHz to 2170 MHz; and high band—2300 MHz to 2700 MHz. Additional frequency extensions for 600 MHz on the low end and up to 5600 MHz on the high end are being considered for mobile communications as well. Expansion of the frequency range exacerbates the problem.

Typical antenna structures, like planar inverted F antennas (PIFA), mono-pole, or loop antennas, used in mobile communication devices have operational bandwidths around 10%. Meaning they cover about 10% frequency bandwidth with usable efficiency. For example, an antenna operating with a center frequency of 850 MHz will have usable operation bandwidth of around 85 MHz. The needed bandwidth to fully cover any of the bands of interest exceeds 10% bandwidth as shown in Table I below.

TABLE I

| Band Description | Frequency Coverage | % Bandwidth |
| --- | --- | --- |
| Low band | 698 to 960 MHz | ~32% |
| Mid band | 1710 to 2170 MHz | ~24% |
| High Band | 2300 to 2700 MHz | ~16% |

In addition to bandwidth, the size of the antenna also drives the usable efficiency. For high efficiency resonance, the antenna structure must be able to support ½ wavelength of current and voltage distribution at the frequency of interest. For higher frequencies, the device has sufficient size to support ½ wave current mode. At lower frequencies, where the wavelength is longer, the device is not big enough to support a ½ wave current mode. The impact of which is lower efficiency. To summarize, at low frequency, the antenna performance is degraded by two factors: 1) the need to cover much more than 10% bandwidth and 2) the antenna is becoming small in terms of wavelengths.

Carrier aggregation is an important feature of LTE Advanced. Carrier aggregation allows network operators to combine channels in different frequency bands to multiply the available bandwidth given to a single user at a given moment in time. There are a large number of possible frequency band combinations that can be used in carrier aggregation. Many of the combinations include frequencies from different locations in the spectrum. For instance combining a low band channel with a mid-band or high band channel. Some combinations combine channels from two different bands, but are such that a single antenna resonance can cover both bands of interest. An example would be two closely spaced mid band channels. These combinations are not challenging from an antenna performance perspective. However, a band combination that combines two channels from adjacent low bands is very challenging from an antenna performance perspective. The main reason is that low band resonators are typically very large when compared to the entire device. It is often difficult to make a single radiator work well much less two low band radiators. For this reason, low band—low band frequency combinations in carrier aggregation are not considered practical.

A common solution to the band width, efficiency, size trade-off is to design a tunable antenna that limits the instantaneous band width to around 10% where the antenna can be designed to have good efficiency. The resonant frequency of the antenna can be changed by loading the aperture with a variable reactive load so that it can be used over a wide range of frequencies. The antenna impedance can also be tuned to allow greater power transfer into the antenna terminals. However, this method does not provide optimum efficiency and will not be further discussed.

FIG. 6 shows the typical response of a multi-resonant Planzr Inverted F Antenna (PIFA). As shown in FIG. 6, the low band is 698 MHz to 960 MHz, the mid band is 1710 MHz to 2170 MHz and the high band is 2300 MHz to 2700 MHz. A standard multi-resonant PIFA designed with three resonances would have each resonance cover a fraction of the desired bandwidth.

FIGS. 7A and 7B show typical multi-resonant PIFA with a variable capacitor connected to the low band "arm" of the antenna. In FIG. 7A, the device 100 includes a ground plane 702 and a dual resonance antenna structure. The device 100 includes an electrically conductive frame 706 such as a metal frame, that can function as an external antenna. The antenna structure includes three legs 710, 712, 714 that are each coupled to the frame 706. Leg 710 is coupled to the frame 706 and an electrical connection through the ground plane 702 at a feed point 716. Leg 712 is coupled to ground 718. Leg 714 is coupled to the ground plane 702 through a tuner 720. The structure includes a low band resonance region 722, mid band resonance region 724 and high band resonance region 726. This implementation allows the low frequency resonance of the antenna structure to be adjusted over the entire frequency range of interest while maintaining high peak efficiency. In FIG. 7B, the low band resonant region 728 and the mid band/high band resonant region 730 are identified. As shown in FIG. 7B, the low band resonant region 728 is much larger than the mid band/high band resonant region 730. The tuner 720 is within the low band resonant region 728.

FIG. 8 shows the voltage standing wave ratio (VSWR) of the low band resonance of the PIFA from FIGS. 7A-7B. As the capacitance value is increased from $C_{min}$ 802 to $C_{max}$ 804, the resonant frequency of the antenna shifts lower. FIG.

9 shows the corresponding efficiency of the capacitive tuned antenna. The efficiency drops as the capacitance increases from $C_{min}$ 902 to $C_{max}$ 904.

The natural (unloaded) response of the antenna is at the high end of the frequency band. This is where the capacitance loading is minimum ($C_{min}$) As the capacitance loading is increased the antenna resonant frequency drops. The peak antenna efficiency follows the decrease in frequency. A byproduct of this tuning method is that the antenna efficiency also drops as the frequency is lowered. The drop in efficiency is due to two factors: 1) the antenna is becoming "smaller" in terms of wavelength as the frequency decreases (wavelength is increasing); and 2) the capacitance loading is increasing in order to lower the resonant frequency. The combined effect causes the efficiency to drop by 2-3 dB from the high end of the frequency range to the low end of the frequency range.

This type of tunable antenna structure has many performance benefits. By limiting the instantaneous band width of the antenna to about 10%, the antenna efficiency can be maintained. By changing the antenna resonance, not only is the efficiency maintained, but the impedance match is also maintained. This increases the power transfer at the feed terminal of the antenna. The tuning mechanism can be isolated to just one resonant portion of the antenna, for instance the low band region, without affecting the other resonant regions of the antenna. Multiple tuners can be applied to the different resonant arms of the antenna structure to tune each resonance independently.

The main drawbacks are discussed above with regards to the drop in efficiency in the low end of the frequency range. Higher capacitance loading leads to lower efficiency. In addition, parallel capacitance on the antenna structure only lowers the resonant frequency. This means the antenna structure natural resonance, unloaded, must be at the high end of the frequency band of interest. If the natural resonance of the antenna is near the low end of the frequency band of interest, capacitive loading will only tune the resonance lower.

This design approach yields a single narrow band, high efficiency resonance in the low frequency range, so this design approach cannot be used in carrier aggregation applications where channels from two adjacent low frequency bands are needed.

Therefore, there is a need in the art for an antenna structure that is efficient in two adjacent low frequency bands.

SUMMARY

The present disclosure generally relates to any device capable of wireless communication, such as a mobile telephone or wearable device, having one or more antennas. The antenna has a structure with multiple resonances to cover all commercial wireless communications bands from a single antenna with one feed connection to the main radio system. The antenna is usable where there are two highly efficient, closely spaced resonances in the lower part of the frequency band. One of those resonances can be adjusted in real time by using a variable reactance attached to the radiator while the other resonance is fixed.

In one embodiment, a device (1000) comprises a ground plane (1002); an antenna structure (1004) including: a metal frame (1030); a first leg (1006) coupled to a feed point (1016) and to the metal frame (1030); a second leg (1008) coupled to the ground plane (1002) and the metal frame (1030); a third leg (1010) coupled to the ground plane (1002); and an arm (1012) coupled to the second leg (1008) and the third leg (1010); and a variable reactance device (1024) coupled to the ground plane (1002) and the arm (1012).

A method of using method of using a device (1000), wherein the device (1000) includes a ground plane (1002); an antenna structure (1024) including: a metal frame (1030); a first leg (1006) coupled to a feed point (1016) and to the metal frame (1030); a second leg (1008) coupled to the ground plane (1002) and the metal frame (1030); a third leg (1010) coupled to the ground plane (1002); and an arm (1012) coupled to the second leg (1008) and the third leg (1010); and a variable reactance device (1024) coupled to the ground plane (1002) and the arm (1012), the method comprising: tuning the antenna structure (1004) in two closely spaced channels that are within the same band.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 3 is a schematic illustration of a device, in this example a cellular telephone, with a DVC and antenna.

FIG. 4 is a schematic illustration of a DVC as one of many possible instantiations of a variable reactance, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to any device capable of wireless communication, such as a mobile telephone or wearable device, having one or more antennas. The antenna has a structure with multiple resonances to cover all commercial wireless communications bands from a single antenna with one feed connection to the main radio system. The antenna is usable where there are two highly efficient, closely spaced resonances in the lower part of the frequency band. One of those resonances can be adjusted in real time by using a variable reactance attached to the radiator while the other resonance is fixed.

MEMS based capacitors and switches are used as tuners to vary the reactance of a device because MEMS based RF devices have performance characteristics not found in solid-state, semiconductor devices. These attributes are, very low off capacitance, low equivalent series resistance, high linearity, and tolerance to high voltage across the terminals of the device. This last attribute, the ability to maintain all other performance characteristics in the presence of high voltage, is the main reason why MEMS based capacitors and switches enable the multi-resonant antenna structure with two closely spaced low band resonances where one of those is tunable.

Figure 1:
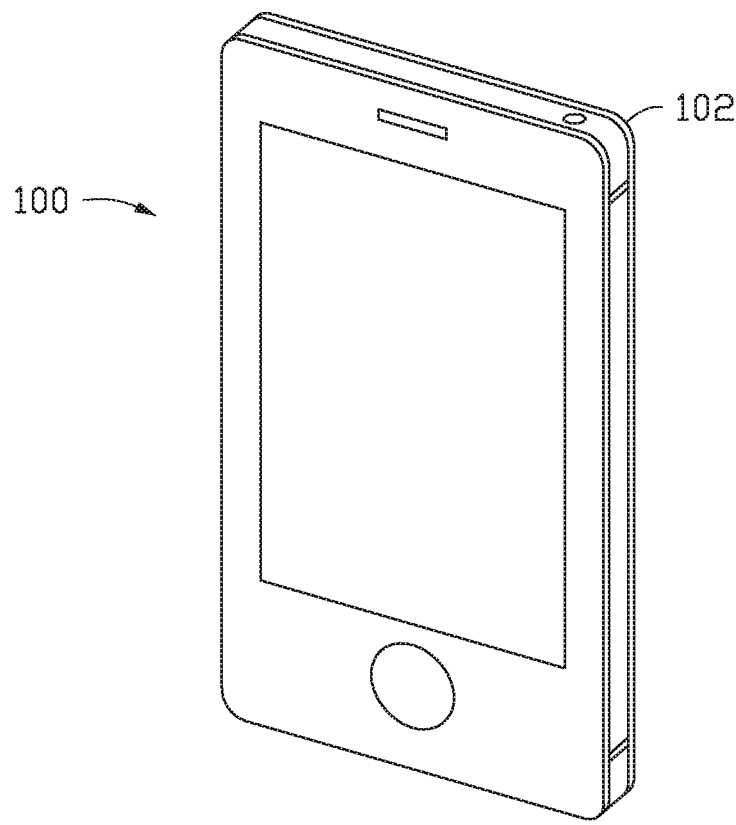
FIG. 1 is a schematic illustration of a device, in this example a cellular telephone, in free space.

FIG. 1 is a schematic illustration of a device 100 in free space, where the device has one or more antennas. The device 100 has at least one antenna 102 that may be external to the device body. It is to be understood that the antenna 102 is not limited to being external. Rather, the antenna 102 may be disposed inside the device body. The device 100 may be used to send/receive emails, voice calls, text messages, and data such as internet webpages and apps through any wireless connection, such as but not limited to a cellular service that utilizes the various frequency bands allocated for 2G, 3G, 4G LTE (long term evolution), etc, and/or WiFi, Bluetooth, NFC to name a few other wireless connection types. As shown in FIG. 1, the device 100 is in free space where no other objects, such as a human being, is disposed at a location to interfere with the device 100 operation. As the human being interacts with the device 100, however, the head/hand effect appears and the electrical characteristics of the antenna 102 changes.

Figure 2:
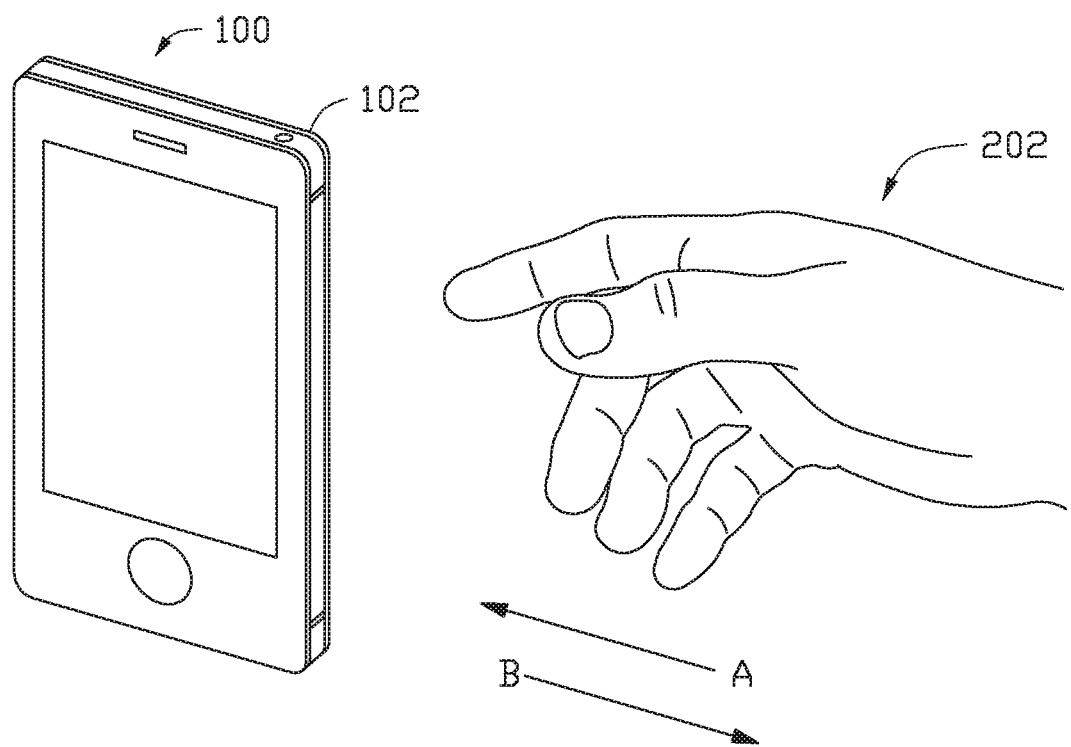
FIG. 2 is a schematic illustration of a device, in this example a cellular telephone, with a hand nearby, where the hand is a placeholder for any kind change in the electrical environment that can impact the electrical characteristics and operation of the antenna.

FIG. 2 is a schematic illustration of a device 100 with a hand 202 nearby. Hand 202 exemplifies one of many possible forms of environmental interactions device 100 is exposed to during operation, which can have an effect on the electrical characteristics of the antenna 102. As the hand 202 moves closer to the device 100 as shown by arrow "A", the electrical environment of the antenna 102 changes. Specifically, the hand 202 typically adds a capacitive load that shifts the resonant frequency of the antenna 102, but the electrical characteristics can change in other ways such as a reduction in the capacitive load or changes in the antenna's inductive load. A similar effect occurs when the device 100 nears the user's head (not shown), is placed on a physical object or in proximity to moving objects, all of which can disturb the electrical characteristics of the antenna 102. As the hand 202 moves away from the device 100 as shown by arrow "B", the electrical characteristics of the antenna 102 change yet again. Specifically, the removal of the hand typically removes a capacitive load that again shifts the resonant frequency of the antenna 102, but other changes in the reactive loading of the antenna are also possible. In actuality, moving the hand 202 away from the device 100 returns the electrical characteristics of the antenna 102 back close to the original condition, where the resonant frequency returns to the state that existed prior to the disturbance of its electrical characteristics. Depending on the specifics of the environment and its changes, and the user's head/hand interaction with device 100 during operation, the changes in the electrical environment of device 100 can represent a change in the inductance of antenna 102, although the majority of cases the changes will result in a change in capacitance. FIG. 3 is a schematic illustration of a device 100, in this example a cellular telephone, with a DVC 302 and antenna 304.

FIG. 4 is a schematic illustration of a Micro Electro Mechanical System (MEMS) based DVC 400, according to one embodiment. The MEMS DVC includes a plurality of cavities 402 that each have an RF electrode 404 that is coupled to a common RF bump 406. Each cavity has one or more pull-in or pull-down electrodes 408 and one or more ground electrodes 410. A switching element 412 moves from a position far away from the RF electrode 404 and a position close to the RF electrode 404 to change the capacitance in the MEMS DVC 400. The MEMS DVC 400 has numerous switching elements 412 and therefore has a large variable capacitance range that can be applied/removed from the antenna aperture in order to maintain a constant resonant frequency and compensate for changes in the electrical characteristics of an antenna that is under the influence of environmental changes or head/hand effect. The MEMS DVC 400 is, in essence, a collection of multiple individually controlled MEMS elements.

Figure 5A:
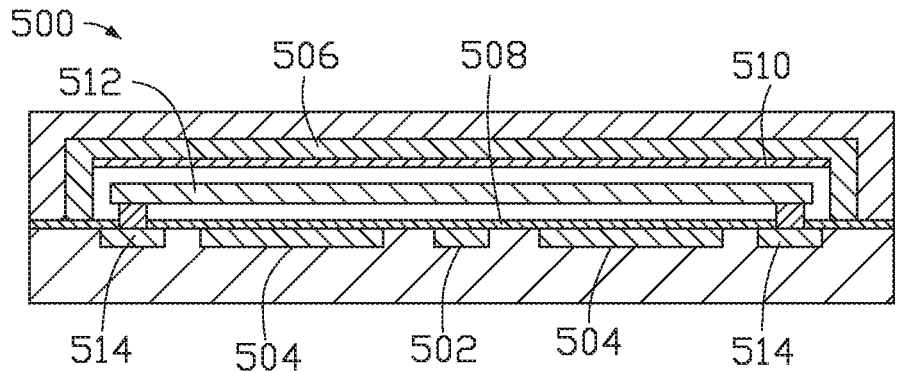
FIGS. 5A-5C are schematic cross-sectional illustrations of a microelectromechanical (MEMS) device that can be utilized as variable reactance according to one embodiment.
Figure 5B:
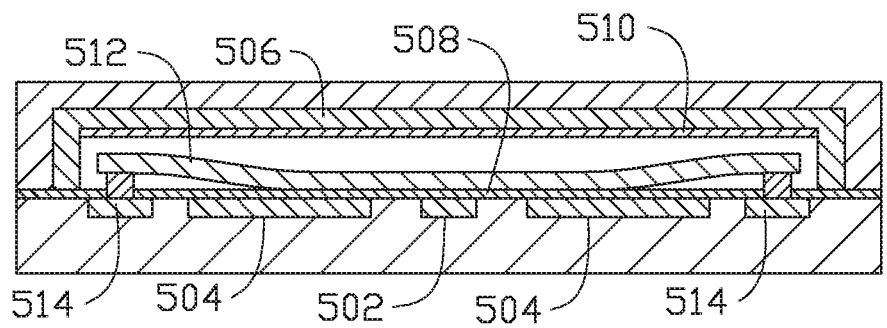
Figure 5C:
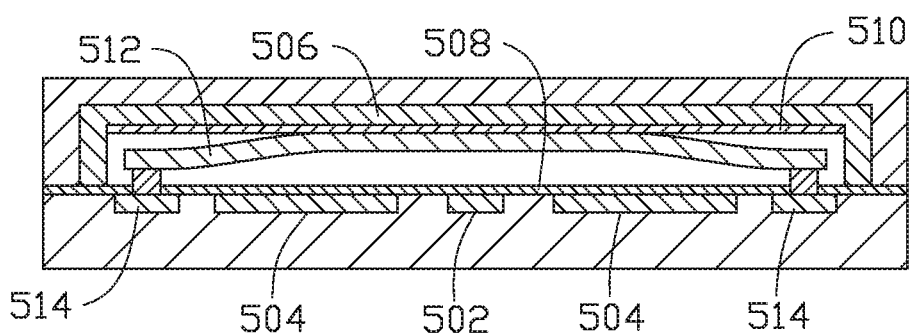
Figure 6:
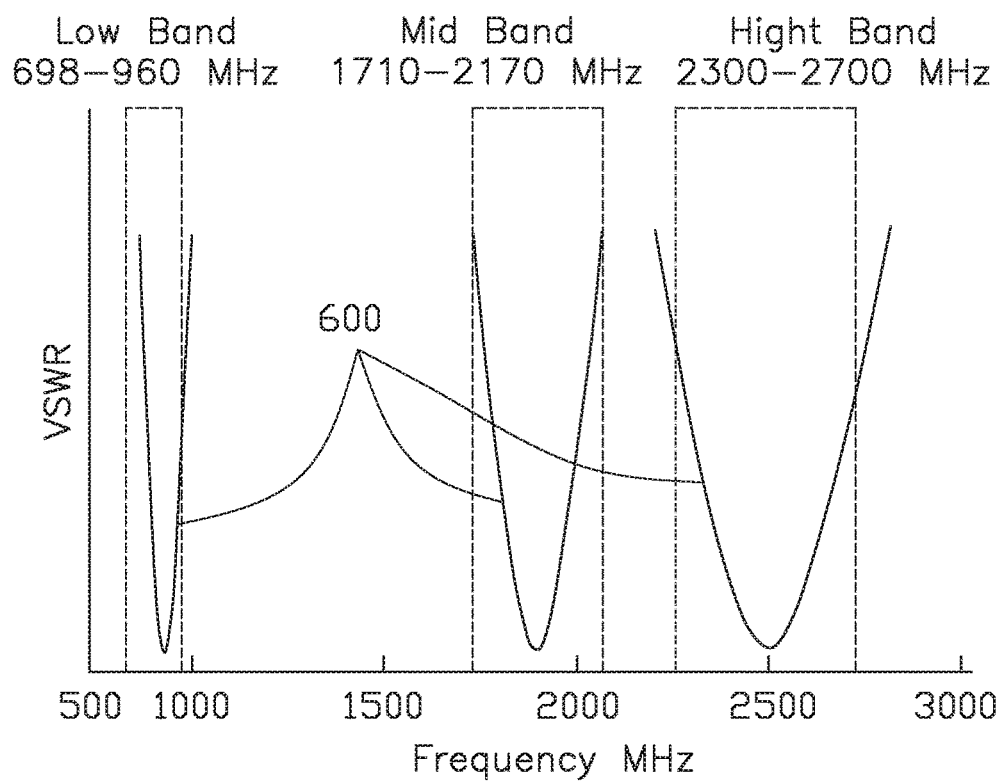
FIG. 6 shows the typical response of a multi-resonant Planzr Inverted F Antenna (PIFA).
Figure 7A:
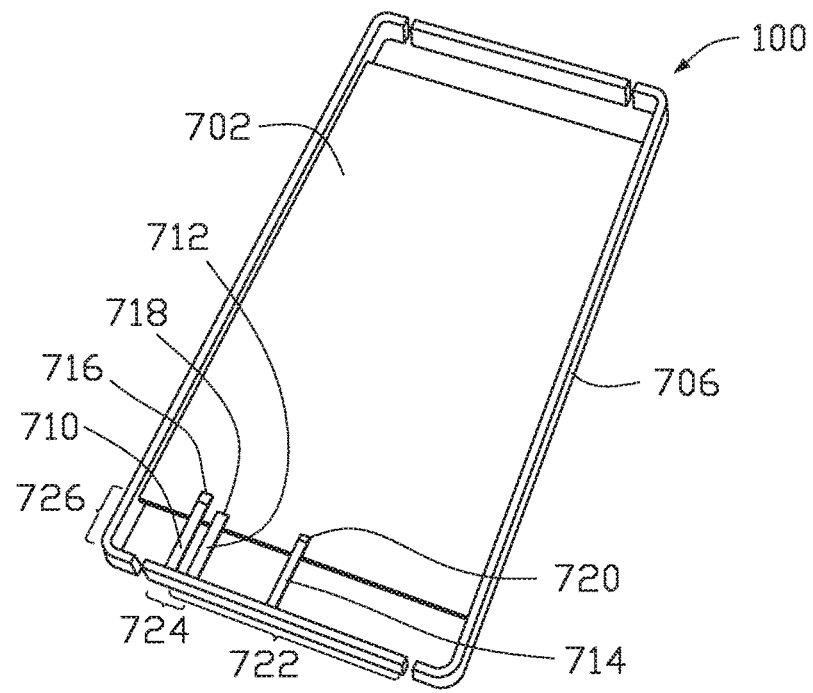
FIGS. 7A and 7B are schematic illustrations of a device and antenna tunable within a single band.
Figure 7B:
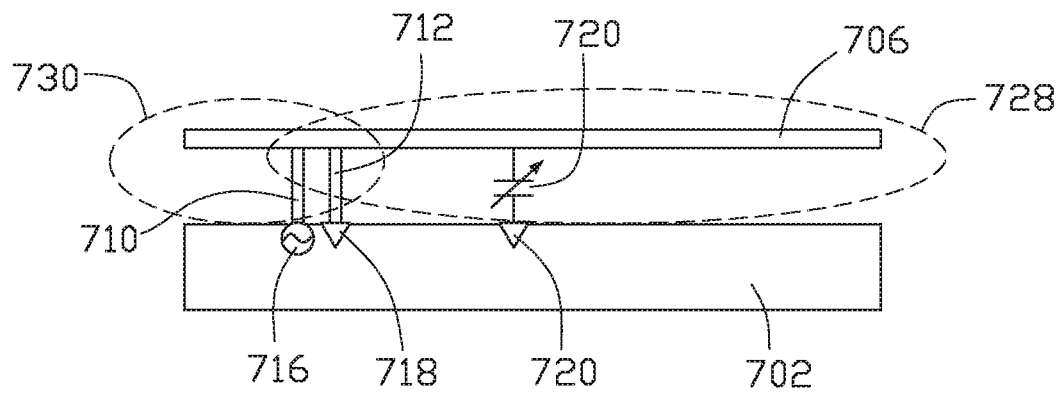

FIGS. 5A-5C are schematic cross-sectional illustrations of a single MEMS element 500 that can create the plurality of switching elements 412 in the plurality of cavities 402 in MEMS DVC 400, according to one embodiment. The MEMS element 500 includes an RF electrode 502, pull-down electrodes 504, a pull-up electrode 506, a first dielectric layer 508 overlying the RF electrode 502 and pull-down electrode 504, a second dielectric layer 510 overlying the pull-up electrode 506, and a switching element 512 that is movable between the first dielectric layer 508 and the second dielectric layer 510. The switching element 512 is coupled to grounding electrodes 514. As shown in FIG. 5B, the MEMS element 500 is in the maximum capacitance position when the switching device 512 is closest to the RF electrode 502. As shown in FIG. 5C, the MEMS element 500 is in the minimum capacitance position when the switching device 512 is furthest away from the RF electrode 502. Thus MEMS element 500 creates a variable capacitor with two different capacitance stages, and integrating a plurality of such MEMS element 500 into a single MEMS DVC 400 is able to create a DVC with great granularity and capacitance range to effect the reactive aperture tuning that is required to maintain a constant resonant frequency, and compensate for changes in the electrical characteristics of an antenna that is under the influence of environmental changes or head/hand effect.

Figure 10A:
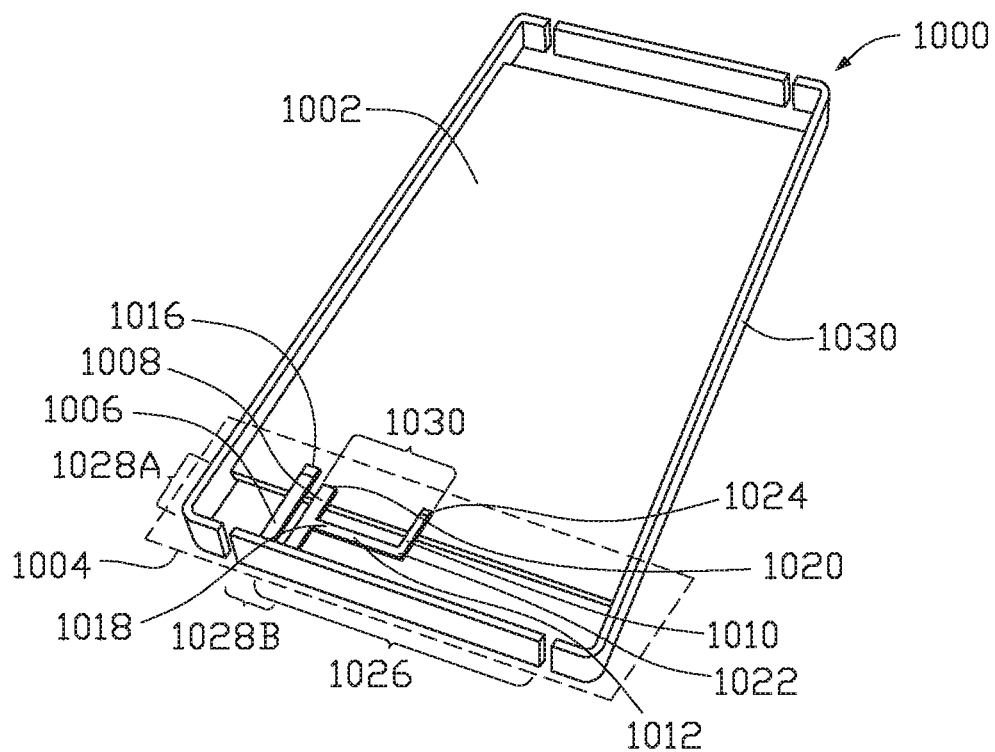
FIGS. 10A-10C are schematic illustrations of a device and antenna that is both fixed and tunable within a single band.
Figure 10B:
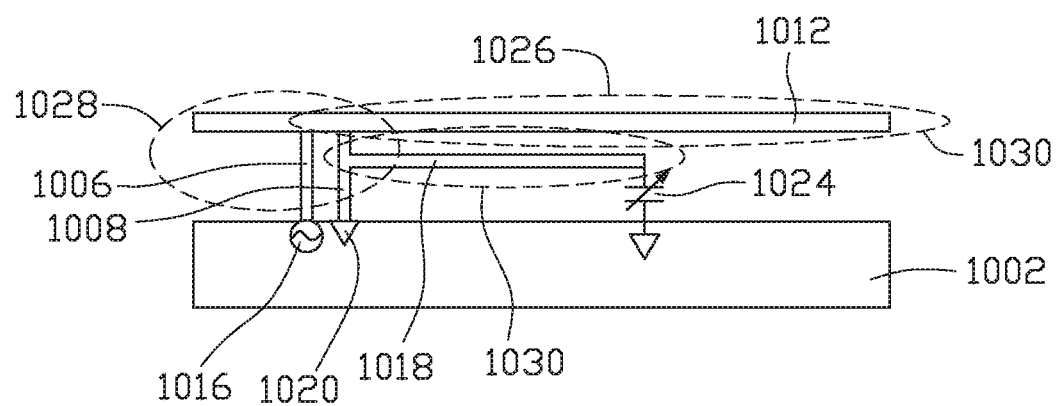
Figure 10C:
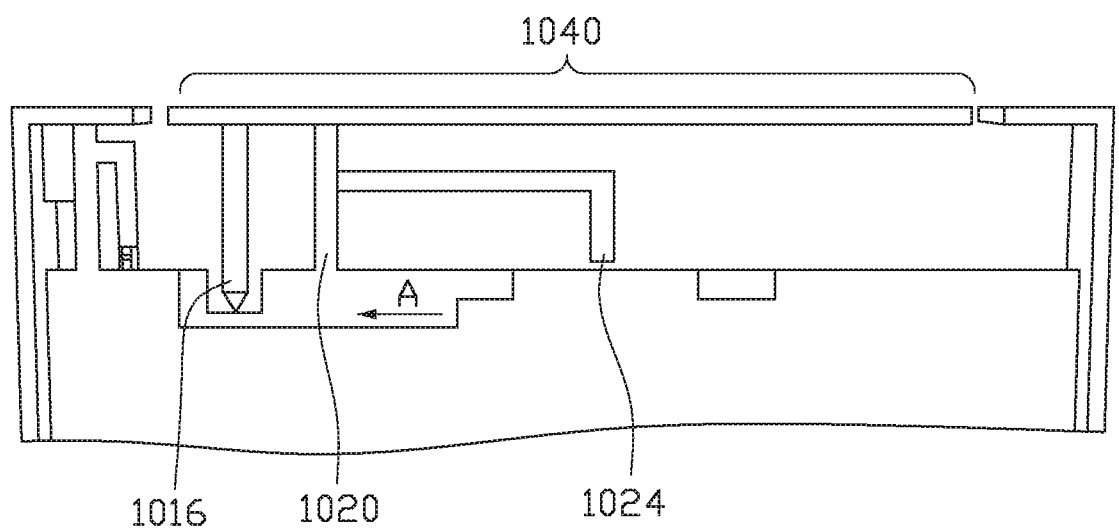

FIGS. 10A-10C illustrate a typical smartphone implementation where a single antenna covers multiple frequency bands and protocols. It is to be understood that the antenna may be used in any mobile data device where a single antenna is required to cover multiple frequency bands and protocols.

FIG. 10A shows a device 1000 having a ground plane 1002 and an antenna structure 1004. The antenna structure 1004 includes a first leg 1006, a second leg 1008 and a third leg 1010. The metal frame 1030, which acts as an antenna, is coupled to the first leg 1006. The first leg 1006 is also coupled to a power source through a feed point 1016 on the ground plane 1002. The second leg 1008 is also coupled to the metal frame 1030 and the ground plane 1002 through a ground connection point 1020. An arm 1012 is coupled to the second leg 1008 at a first end 1018 thereof. The arm 1012 is also coupled to the third leg 1010 at an end 1022 thereof.

A variable reactance device 1024 is disposed between the third leg 1010 and the ground plane 1002. It is contemplated that the variable reactance device 1024 is disposed directly between the arm 1012 and the ground plane 1002 as shown in FIG. 10B. The variable reactance device 1024 may be a DVC 400 as discussed above with regards to FIG. 4.

In FIGS. 10A and 10B, the antenna structure 1004 uses two low frequency resonators. One of the resonators has a fixed resonant frequency while the other resonator frequency can be adjusted using a variable reactance device 1024. As shown in FIG. 10B, there are two low band resonant regions 1026, 1030 and one mid band/high band resonant region 1028. One low band region 1026 is fixed while the other low band region 1030 is variable due to the presence of the variable reactance device 1024. The mid band resonant region 1028B and the high band resonant region 1028A as shown in FIG. 10A. The main PIFA 1040 of the metal frame 1030 is the "long frame" of the antenna structure which means that the base resonant frequency of the main PIFA 1040 is lower than 900 MHz, which can be accomplished by moving the feed point 1016 and the ground connection point 1020 of the "short" arm 1012.

Figure 8:
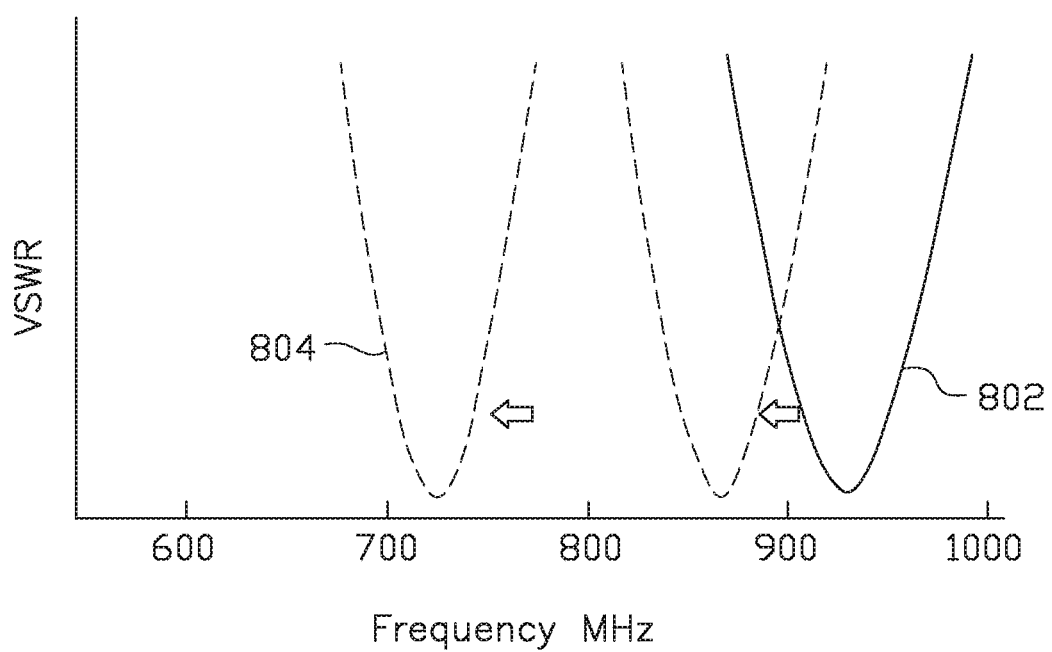
FIG. 8 is a graph showing the change in resonant frequency through the low band frequency range.
Figure 11:
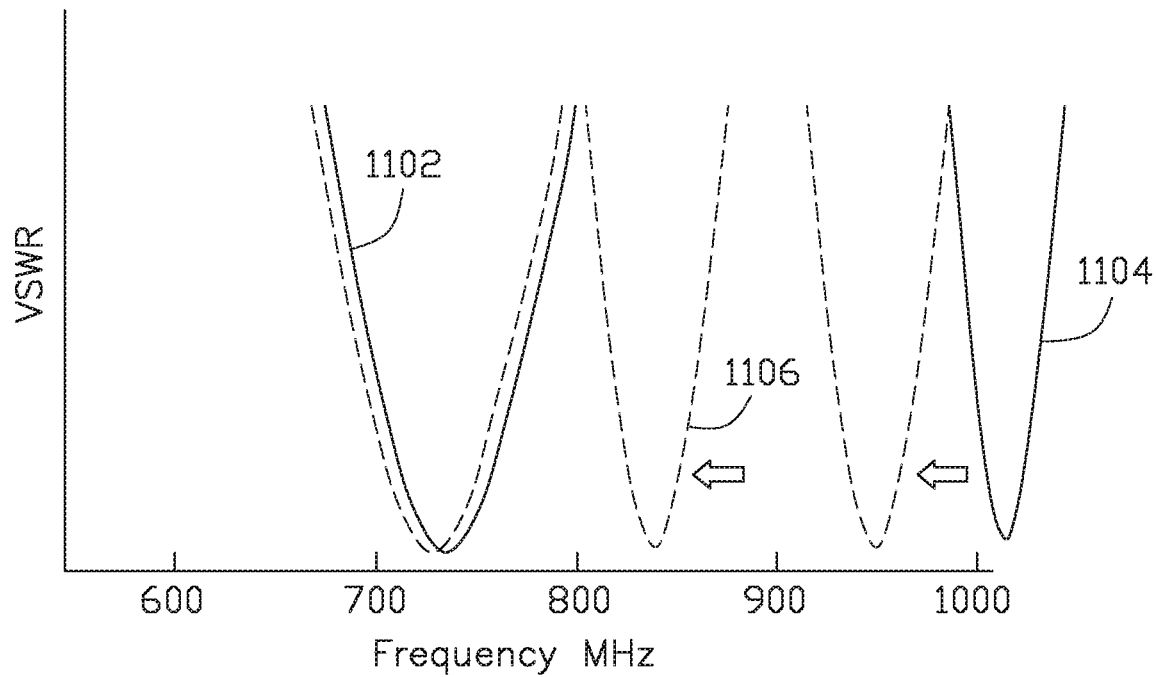
FIG. 11 is a graph showing the change in resonant frequency through the low band frequency range.

FIG. 11 shows the voltage standing wave ratio (VSWR) of the low band frequency response of the PIFA with dual low band resonators. Item 1102 is the natural resonance of the antenna structure 1004 and has a fixed frequency in the low band region 1026. Item 1104 is generated by a separate smaller resonator (i.e., arm 1012) that is loaded with a variable reactance device 1024 at the end of the arm 1012. The arm 1012 has a higher resonant frequency than metal frame 1030. The fundamental resonance of item 1104 is higher than the highest frequency in the desired frequency range. Increasing the capacitance loading at the end of the resonator lowers the resonant frequency. The second resonance can be tuned over the frequency band of interest while resonance 1 remains at a fixed frequency. As the capacitance is increased from $C_{min}$ at item 1104 to $C_{max}$ at item 1106, the lower response does not move much compared to FIG. 8. The upper response moves down as the tuner capacitance is increased.

Figure 12:
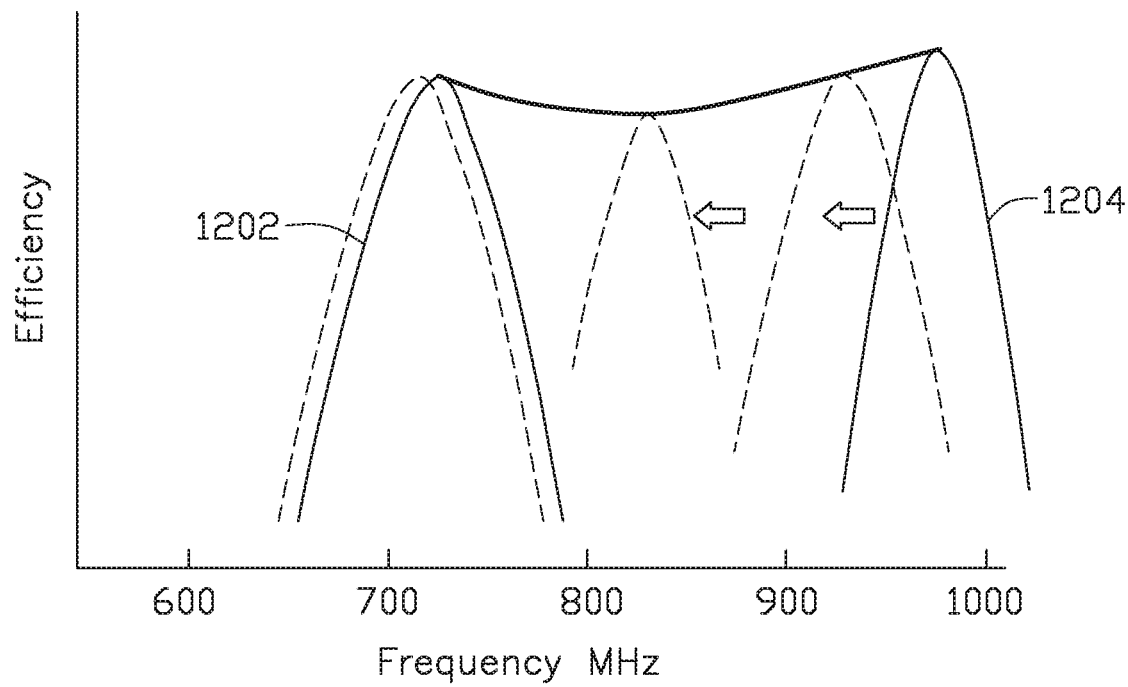
FIG. 12 is a graph showing the change in efficiency through the low band frequency range.

FIG. 12 shows the efficiency of the dual resonant PIFA. Item 1202 shows a fixed resonant frequency (corresponding to metal frame 1030) and contributes to the efficiency at the low end of the frequency range while item 1204 (corresponding to arm 1012) shows that the resonant frequency is tunable (via variable reactance device 1024) and contributes to the efficiency across the rest of the low frequency range.

Figure 9:
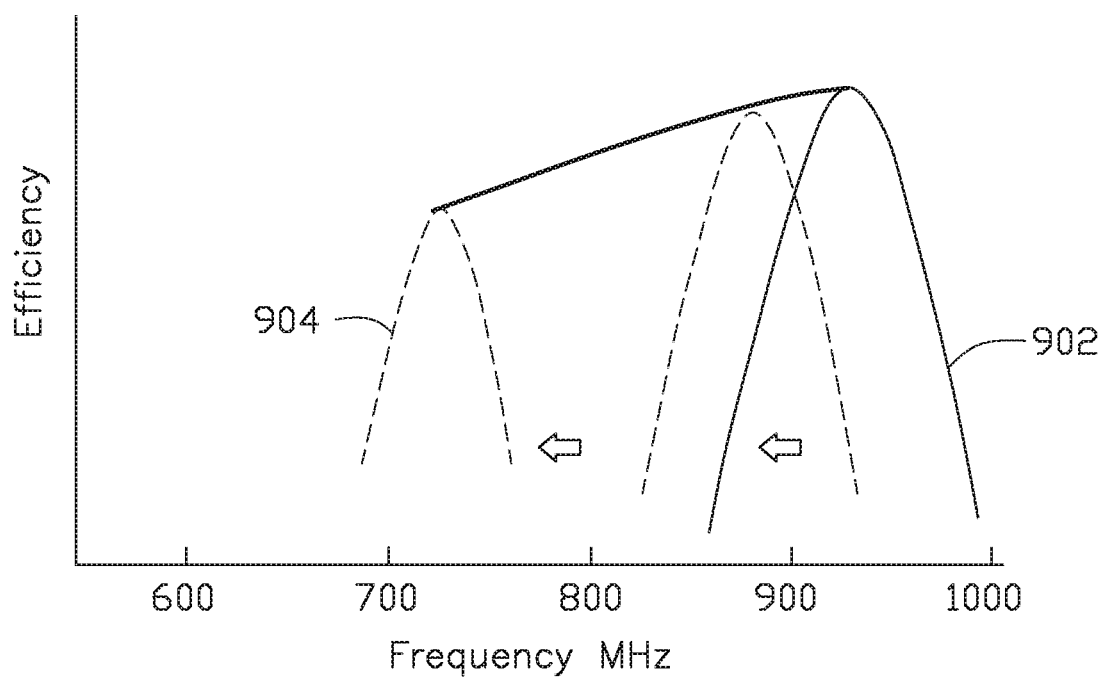
FIG. 9 is a graph showing the change in efficiency through the low band frequency range.

The tunable antenna design discussed herein does not exhibit an efficiency roll-off at the low end of the frequency range like a standard single resonance PIFA. FIG. 12 shows that the efficiency at the low end of the band (i.e., $C_{max}$) is much higher than a traditional tunable PIFA (i.e., FIG. 9) and is very close to the efficiency at $C_{min}$. Devices can be easily tuned when the antenna structures have a natural resonant frequency of the structure that is at the low end of the frequency range. The antenna structure discussed herein can also be used for low band—low band carrier aggregation applications where two channels in different parts of the low frequency range must be combined together.

For a multi band antenna structure discussed herein to work, the reactive tuning device 1024 (i.e., a DVC 400) must have exceptional performance. Table II below shows the key performance parameters that enable the dual resonance PIFA.

TABLE II

| Parameter | Value | Benefit |
|---|---|---|
| Minimum Capacitance Cmin | <0.5 pF | Efficiency - less capacitive loading results in greater efficiency |
| Equivalent Series Resistance (ESR) | <0.5 ohms | Efficiency - lower ESR results in lower implementation loss |
| Linearity (IP3) | >85 dBm | Harmonics - in this case, IP3 is a proxy for low $2^{nd}$ and $3^{rd}$ order harmonics. Very important for Carrier Aggregation applications |
| Voltage Handling | >40 VRMS | The device must maintain all of the above performance parameters even in the presence of high voltage |
| Capacitance Range | >5:1 | Supports tuning over a wide frequency range |

The variable reactance device 1024 is placed at or near the end 1022 of the arm 1012. This is a region of the resonator where the voltage is reaching its maximum value. This is a non-50 ohm region on the antenna so the voltage level can be quite high (>40 VRMS). MEMS DVCs are the only devices available that exhibit all of the key performance parameters simultaneously and maintain those parameters in the presence of high voltage.

While the foregoing is directed to embodiments of the present disclosure, other and further embodiments of the disclosure may be devised without departing from the basic scope thereof, and the scope thereof is determined by the claims that follow.

What is claimed is:

1. A device, comprising:
   a ground plane;
   an antenna structure including:
      a metal frame;
      a first leg coupled to a feed point and to the metal frame;
      a second leg coupled to the ground plane and the metal frame;
      a third leg coupled to the ground plane; and
      an arm coupled between the second leg and the third leg;
   and
   a variable reactance device coupled to the ground plane and the arm.

2. The device of claim 1, wherein the variable reactance device comprises a digital variable capacitor.

3. The device of claim 2, wherein the digital variable capacitor comprises a plurality of MEMS elements.

4. The device of claim 1, wherein the device is a mobile telephone.

5. The device of claim 1, wherein the metal frame has a fixed resonant frequency.

6. The device of claim 5, wherein the arm has a variable resonant frequency.

7. The device of claim 1, wherein the variable reactance device has a capacitance of 0.5 pF.

8. The device of claim 1, wherein the variable reactance device has an equivalent series resistance of <0.5 ohms.

9. The device of claim 1, wherein the variable reactance device has a linearity of >85 dBm.

10. The device of claim 1, wherein the variable reactance device has a voltage handling of >40 VRMS.

11. The device of claim 1, wherein the variable reactance device has a capacitance range of >5:1.

12. A method of using a device, wherein the device includes a ground plane; an antenna structure including: a metal frame; a first leg coupled to a feed point and to the metal frame; a second leg coupled to the ground plane and the metal frame; a third leg coupled to the ground plane; and an arm coupled between the second leg and the third leg; and a variable reactance device coupled to the ground plane and the arm, the method comprising:

tuning the antenna structure in two closely spaced channels that are within the same band.

13. The method of claim 12, wherein band operates in a frequency range of 698 to 960 MHz.

14. The method of claim 12, wherein band operates in a frequency range of 1710 to 2170 MHz.

15. The method of claim 12, wherein band operates in a frequency range of 2300 to 2700 MHz.

* * * * *